(12) United States Patent
Cosserat et al.

(10) Patent No.: US 11,425,206 B2
(45) Date of Patent: Aug. 23, 2022

(54) METHOD AND SYSTEM FOR SHARING COMMUNICATION BETWEEN CONNECTED HOME-AUTOMATION DEVICES AND A REMOTE DEVICE

(71) Applicant: SOMFY ACTIVITES SA, Cluses (FR)

(72) Inventors: Hubert Cosserat, Vetraz Monthoux (FR); Jean Michel Orsat, Châtillon sur Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 17/255,624

(22) PCT Filed: Jun. 27, 2019

(86) PCT No.: PCT/EP2019/067119
§ 371 (c)(1),
(2) Date: Dec. 23, 2020

(87) PCT Pub. No.: WO2020/002490
PCT Pub. Date: Jan. 2, 2020

(65) Prior Publication Data
US 2021/0258387 A1     Aug. 19, 2021

(30) Foreign Application Priority Data
Jun. 28, 2018   (FR) ...................... 1855844

(51) Int. Cl.
*G06F 15/16*     (2006.01)
*H04L 67/142*    (2022.01)
(Continued)

(52) U.S. Cl.
CPC ........ *H04L 67/142* (2013.01); *H04L 12/2807* (2013.01); *H04L 67/141* (2013.01)

(58) Field of Classification Search
CPC .. H04L 67/142; H04L 12/2807; H04L 67/141
(Continued)

(56) References Cited

U.S. PATENT DOCUMENTS

| 7,738,504 | B1* | 6/2010 | Deaner | H04L 41/00 370/503 |
| 2002/0142774 | A1* | 10/2002 | Saint-Hilaire | H04L 69/163 455/445 |

(Continued)

FOREIGN PATENT DOCUMENTS

WO     2017/176241     10/2017

OTHER PUBLICATIONS

International Search Report for PCT/EP2019/067119 dated Jul. 31, 2019, 5 pages.
(Continued)

*Primary Examiner* — Duyen M Doan
(74) *Attorney, Agent, or Firm* — Nixon & Vanderhye (57) ABSTRACT

Disclosed is a method and a system for sharing communication between connected home-automation devices belonging to a first communication network and a remote device connected to a second communication network, the first communication network being connected to the second communication network by a network device, the network device being suitable for allowing communication between at least one connected home-automation device of the first network and the remote device. The method includes determining a communication link device among the connected home-automation devices of the first communication network, as a function of at least one feature of the connected home-automation devices, and maintaining, by the communication link device, a communication channel between the first communication network and the remote device via the
(Continued)

network device for the benefit of the other connected home-automation devices of the first communication network.

20 Claims, 4 Drawing Sheets

(51) Int. Cl.
*H04L 12/28* (2006.01)
*H04L 67/141* (2022.01)

(58) Field of Classification Search
USPC .................................................. 709/203, 217
See application file for complete search history.

(56) References Cited

U.S. PATENT DOCUMENTS

| | | | |
|---|---|---|---|
| 2007/0019610 A1* | 1/2007 | Backholm | H04L 43/0811 370/349 |
| 2014/0379900 A1 | 12/2014 | Dasgupta et al. | |
| 2015/0067080 A1* | 3/2015 | Cho | H04L 67/025 709/206 |
| 2018/0091600 A1 | 3/2018 | Yang et al. | |
| 2018/0278474 A1* | 9/2018 | Van Der Geer | H04L 29/08351 |

OTHER PUBLICATIONS

Written Opinion of the ISA for PCT/EP2019/067119 dated Jul. 31, 2019, 6 pages.

* cited by examiner

METHOD AND SYSTEM FOR SHARING COMMUNICATION BETWEEN CONNECTED HOME-AUTOMATION DEVICES AND A REMOTE DEVICE

This application is the U.S. national phase of International Application No. PCT/EP2019/067119 filed Jun. 27, 2019 which designated the U.S. and claims priority to FR Patent Application No. 1855844 filed Jun. 28, 2018, the entire contents of each of which are hereby incorporated by reference.

BACKGROUND OF THE INVENTION

Field of the Invention

The present invention relates to a communication sharing method and system for sharing communication between the connected home automation (domotic) equipment units belonging to a first communication network and a remote equipment unit belonging to a second communication network.

The invention is positioned in the field of connected equipment or objects, and a particular application thereof lies in the field of home automation systems.

Description of the Related Art

The term "connected equipment" (unit/s) is understood to refer to any device provided with at least one telecommunication means configured so as to transmit and/or receive an electrical or electromagnetic signal based on at least one predetermined communication protocol. The equipment unit is connected to a communication network or data exchange network, and may be searchable and/or controllable remotely. The connected equipment unit is of any type. It may be, for example, an actuator, a measuring sensor, a control point, etc. Hereinafter, the equipment units connected to a communication network are said to belong to the communication network.

In a known manner, particularly in the field of home automation installations, a variety of equipment units are provided with a communication capability based on a network protocol, such as the IP (for "Internet Protocol"), and are capable of communicating with each other based on a given topology. The connection of home automation equipment units with one another forms a first communication network which is a local network or LAN (for "Local Area Network"), for example a home network. Hereinafter, the connected equipment units belonging to the local network will be referred to as "local equipment units".

In order to communicate with external equipment units that are outside the local network—also referred to hereinafter as remote equipment units—for example servers, connected to a second communication network which is a wide area network or WAN (for "Wide Area Network"), typically the Internet network, it is normal practice to use a network equipment unit that carries out in particular an address translation between local addresses—also referred to as "private addresses"—on the local network, and addresses of the wide area network also referred to as "public addresses". In this case, the network equipment unit is said to be implementing an address translation function or NAT (for "Network Address Translation"). It is also known practice to implement a protection functionality, referred to as "firewall" (as per the accepted terminology), in order to ensure a certain level of local network security and prevent digital piracy/hacking.

In known manner, the communication between local equipment units and remote equipment units consists of the transmission and reception of data packets formatted according to at least one chosen communication protocol. The movement of communication packets circulating over a communication network or between communication networks is referred to as network traffic.

It is possible to implement a configuration in order to open one or more communication ports of the network equipment unit so as to allow remote servers, belonging to the second network, to communicate with equipment units of the local network. But such a configuration is complex to implement for a user who is not an IT professional. In addition, the configuration of communication ports may depend on the network equipment unit used.

It is also possible to maintain active the communication sessions between local equipment units and a remote equipment unit, by using the TCP ("Transmission Control Protocol"), each session being maintained until such time as an end of session command is transmitted. This poses a problem because the maintaining of a TCP session involves significant consumption of electrical energy for local and remote equipment units, whereas in a home automation installation, some of the local connected equipment units are powered by battery.

Alternatively, a local equipment unit can use the UDP ("User Datagram Protocol") in order to contact a remote equipment unit. This communication between a local equipment unit and a remote equipment unit creates a communication channel or communication "hole" ("UDP hole punching" as per accepted terminology) in the network equipment unit that performs the address translation and/or firewall function. This communication channel is maintained active for a predetermined time period in the absence of network traffic. In order to avoid deactivation of the communication channel as a result of a prolonged absence of network traffic, small elementary packets ("keep alive packets" as per accepted terminology) intended to maintain the communication channel active, are sent before the lapsing of the predetermined time period (or "timeout" as per accepted terminology).

Although maintaining of a UDP communication channel entails lower consumption of electrical energy for a connected equipment unit than maintaining of a TCP session, this nevertheless remains a not insignificant level of electricity consumption for a connected home automation equipment unit and more particularly for an autonomous (self-contained) connected home automation equipment unit, powered by battery or rechargeable battery.

SUMMARY OF THE INVENTION

The object of the invention is to ameliorate the communication between any connected equipment unit of a first communication network and a remote equipment unit such as a server belonging to a second communication network, while also overcoming the drawbacks of the state of the art.

To this end, the invention provides, according to a first aspect, a communication sharing method for sharing communication between the home automation (domotic) equipment units connected to a first network and a remote equipment unit belonging to a second communication network, the first communication network being connected to the second communication network by a network equipment unit that is adapted so as to enable the communication between at least one connected home automation equipment unit of the first network and said remote equipment unit. This method comprises:

the determination of a communication link device for establishing a communication link from among the connected home automation equipment units of the first communication network, as a function of at least one characteristic feature of said connected home automation equipment units; and the maintenance by said communication link device of a communication channel between the first communication network and the remote equipment unit through said network equipment unit, for the benefit of the other connected home automation equipment units of the first communication network.

Advantageously, the method of the invention makes it possible to determine a communication link device intended to maintain active a shared communication link between all of the connected equipment units of the first network and the remote equipment unit of the second communication network.

Thus, advantageously, the resources consumed by the connected equipment units of the first communication network other than the communication link device, and the resources consumed by the remote equipment unit are reduced as compared to a configuration in which all of the connected home automation equipment units of the first communication network maintain active a communication channel with the remote equipment unit. This reduction in consumption pertains to both electricity resources and computing and radiofrequency resources. Consequently, the useful life of the connected equipment units belonging to the first communication network, and in particular the autonomous connected equipment units, is increased. Likewise, there is reduction in communications passing between the first communication network and the second communication network due to the absence of transmission of small elementary packets intended to maintain active each communication channel. Network traffic is therefore also reduced.

The communication sharing method according to the invention may present one or more of the characteristic features here below, taken into consideration independently or in combination, according to any technically acceptable combinations.

The maintaining of a communication channel includes the regular sending of elementary connection maintenance packets by said communication link device to the remote equipment unit.

The determination of a communication link device depends on at least one characteristic feature from among the set of characteristic features comprising a characteristic feature related to type of electrical power supply, a characteristic feature related to on-board computing capacity, a characteristic feature related to quality of service, a characteristic feature related to spatial position in the first network, a characteristic feature related to the radiofrequency environment.

Each connected home automation equipment unit belonging to the first communication network carries out the determination of a communication link device from among the connected home automation equipment units and effectively implements:

the reception of a discovery message originating from at least one other connected home automation equipment unit belonging to said first network, and comprising an identifier of said other connected home automation equipment unit and a characteristic feature value associated with each characteristic feature of said set of characteristic features for said other connected home automation equipment unit;

the saving and storing of the characteristic feature values received in a table of characteristic features;

the determination of the communication link device as a function of the characteristic feature values saved and stored in the table of characteristic features.

The determination of the communication link device includes a calculation of an overall score associated with said at least one other connected home automation equipment unit as a function of the saved and stored characteristic feature values, and a calculation of a specific overall score, and a comparison of the calculated overall scores, the communication link device having a maximum associated overall score.

The method includes the steps, implemented by the remote equipment unit, as follows:

receiving, from at least a plurality of connected home automation equipment units belonging to the first communication network, of a set of global characteristic information items of each connected home automation equipment unit of said plurality, the set of global characteristic information items comprising an identifier of said connected home automation equipment unit and a characteristic feature value associated with each characteristic feature of said set of characteristic features for said connected home automation equipment unit;

saving and storing of the values of characteristic features received in a table of characteristic features;

calculation of an overall score associated with each connected home automation equipment unit among said plurality of connected home automation equipment units, as a function of the saved and stored characteristic feature values;

determination of the communication link device as a function of the calculated overall scores.

The determination of the communication link device includes a calculation of an overall score associated with each connected home automation equipment unit among said plurality of connected home automation equipment units, as a function of the saved and stored characteristic feature values, and a comparison of the calculated overall scores, the communication link device having a maximum associated overall score.

The method further includes a command sending step for sending a command to maintain the communication channel to said determined communication link device.

The method further includes a command sending step for sending a disconnection command to all the connected home automation equipment units other than the determined communication link device.

The determined communication link device operationally implements a communication link function comprising:

the reception of a request containing a command, an update, or an information item, to be sent to at least one receiving connected home automation equipment unit;

the transmission of said request to said at least one receiving connected home automation equipment unit.

The determined communication link device operationally implements a communication link function comprising:

the reception of an event message containing an information item related to the presence of a command, an update, or an information item, to be sent to at least one receiving connected home automation equipment unit;

the transmission of an information message to said at least one receiving connected home automation equipment unit, and said receiving connected home automation equipment unit implements, following the reception of said information message, a direct communication channel with said remote equipment unit.

According to a second aspect, the invention relates to a communication sharing system for sharing communication between the home automation equipment units connected to a first communication network and a remote equipment unit connected to a second communication network, the first communication network being connected to the second communication network by a network equipment unit that is adapted so as to enable the communication between at least one connected home automation equipment unit of the first network and said remote equipment unit. This communication sharing system comprises modules that are capable of operationally implementing:

the determination of a communication link device for establishing a communication link from among the connected home automation equipment units of the first communication network, as a function of at least one characteristic feature of said connected home automation equipment units; and the maintenance by said communication link device of a communication channel between the first communication network and the remote equipment unit through said network equipment unit, for the benefit of the other connected home automation equipment units of the first communication network.

According to one feature, each connected home automation equipment unit belonging to the first communication network comprises a communication link determining module for determining a communication link device.

According to one feature, the remote equipment unit comprises a communication link determining module for determining a communication link device.

BRIEF DESCRIPTION OF THE DRAWINGS

Other features and advantages of the invention will emerge from the description which is given below, merely by way of indication and without limitation whatsoever, with reference to the appended figures, which are as follows.

DESCRIPTION OF THE PREFERRED EMBODIMENTS

The invention will be described below more particularly in the context of a domotic or home automation installation for buildings intended for commercial, industrial or residential use, whether individual or collective.

A domotic or home automation system comprises a plurality of connected home automation equipment units which are controllable electrical equipment and devices that are designed to provide for comfort and energy management functions, such as heating, ventilation and air conditioning, as also management of lighting and control of openings, such as blinds or roller shutters placed in front of building windows, or even remote security operations by controlling closing systems (doors, locking systems), or monitoring and surveillance systems. Automations are the sets of rules that govern the control of electrical equipment units by means of a programmable monitoring-supervision system, in order to ensure greater comfort for occupants of the building or to optimise energy consumption.

Hereinafter, the term "domotic" will be used for designating in a generic sense, automation, information-communication technology, telecommunication techniques deployed in order to monitor all of the equipment units that are installed in a building whether intended for commercial, industrial or residential use.

Figure 1:
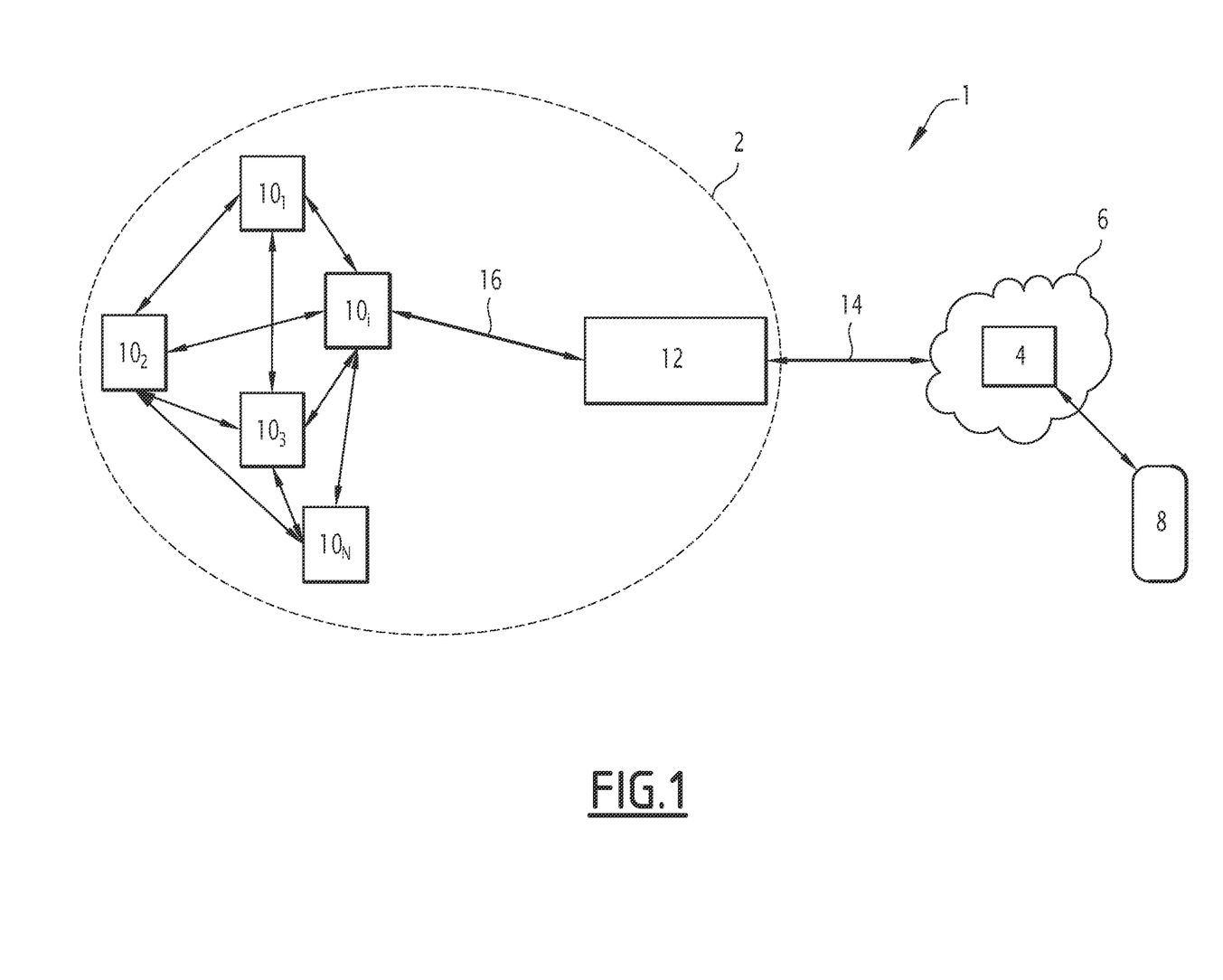
FIG. 1 is a schematic illustration of a communication sharing system for sharing communication between the connected home automation equipment units belonging to a first communication network and a remote equipment unit of a second communication network according to one embodiment.

FIG. 1 schematically illustrates a communication sharing system 1 comprising the connected home automation equipment units belonging to a first communication network 2, which is a local network, and at least one remote equipment unit 4, such as a remote server, connected to a second communication network 6. The second communication network is a wide area network, for example the Internet network.

The remote equipment unit 4 comprises at least one memory storage unit and at least one programmable computing device (not shown) such as a programmable logic component or a dedicated integrated circuit. In the remainder of the description, the remote equipment unit will be considered to be an IT server.

Another equipment unit 8, typically a communication terminal having wired or wireless connection capabilities, for example, a telephone particularly a smartphone or a tablet, is adapted so as to connect to the remote server 4 in order to transmit, for example, one or more commands to the connected home automation equipment units $10_1$, $10_2$, $10_3$, $10_i$, $10_N$ of the first communication network 2.

A connected home automation equipment unit $10_1$, $10_2$, $10_3$, $10_i$, $10_N$ may be an actuator designed so as to move or control/regulate an element of the building, such as a roller shutter or a blind, or to control/regulate a control/regulation system such as a heating system or an aeraulic system. It may also be an element of a lighting system or an alarm system such as a control point, a sensor, a CCTV camera or any other equivalent remote-controllable electrical device.

The connected home automation equipment units $10_1$, $10_2$, $10_3$, $10_i$, $10_N$ adapted so as to communicate with each other, according to a chosen communication protocol. The communication protocol is, for example, a protocol based on IPv4, IPv6, such as Thread or LoRaWAN (Low Power, Wide Area Network), protocols dedicated to connected equipment units.

In the embodiment illustrated, which is the preferred embodiment, the home automation equipment units $10_1$, $10_2$, $10_3$, $10_i$, $10_N$ are connected to each other according to a mesh network topology, and therefore are connected in peer-to-peer setup without central hierarchy. In other words, each pair of equipment units of the first network 2 is adapted so as to communicate with each other via a direct communication link. Each connected home automation equipment unit is configured so as to perform a routing function within the first communication network, that is, to determine the best route to be used within the first communication network for connecting according to a set of rules that form a routing table.

According to one variant not shown, the first communication network is a hierarchical type network, comprising multiple levels of hierarchy, each hierarchical level comprising one or more subnetworks. In this case, particular home automation equipment units serve as subnetwork head-end and implement a routing function.

The first communication network 2 is connected to the second communication network 6 by means of a particular network equipment unit 12 configured so as to implement in particular an address translation (or NAT for "Network Address Translation") function, and/or a firewall or protection function.

The address translation function provides the ability to perform a match-up between the corresponding local network addresses (or private addresses) of the connected home automation equipment units, used for communicating between the equipment within the first network 2, and a global network address (or public address) making it possible to identify the or each equipment unit connected to the second wide area network 6.

The network equipment unit 12 may also be configured so as to perform a modem (for modulator/demodulator) function and/or a network switch function and/or a network hub function and/or a routing function. The network equipment unit 12 is connected in a constant manner, by a communication link 14, to the second communication network 6. In one communication sharing system 1 according to the invention, a particular connected home automation equipment unit of the first network 2, which is the equipment unit 10, in the example illustrated, is selected as communication link device. The function of the communication link device is in particular to maintain active a constant communication channel 16 with the remote server 4 via the network equipment unit 12 and consequently with the second communication network. In particular, the communication link device $10_i$ maintains active a communication channel with the remote server 4.

Advantageously, in one home automation installation, the server 4 implements control and/or monitoring/supervision services for controlling and/or monitoring the home automation equipment units of the first network 2, for example, commands for activation/deactivation of alarms, locking/unlocking of doors, turning on or off heating or air conditioning systems, operating blinds or roller shutters, etc.

Advantageously, an authorised user can, via the equipment 8, connect to the server 4 and command and/or control the home automation installation remotely, transmit updating information, or receive information items or alerts/warnings relating to the home automation installation, for example an alert relating to an intrusion alarm.

According to the invention, the control and monitoring/supervision of the home automation installation, and therefore of each of the connected home automation equipment units $10_1$, $10_2$, $10_3$, ... $10_i$, ... $10_N$ (N representing the number of connected equipment units belonging to the first communication network and i an index between 1 and N) are carried out by means of the communication channel that is maintained active by the communication link device $10_i$ selected as explained in greater detail below.

In one embodiment, each connected home automation equipment unit $10_1$, $10_2$, $10_3$, $10_i$, $10_N$ is adapted so as to connect to the remote server 4 via the network equipment unit 12 and the second communication network via a direct communication channel.

The communication sharing system comprises one or more modules that are capable of implementing the communication sharing method for sharing communication between the connected home automation equipment units $10_1$, $10_2$, $10_3$, $10_i$, $10_N$ belonging to the first communication network 2 and a remote equipment unit 4, for example a remote server 4, connected to the second communication network 6. The module may be integrated within each connected home automation equipment unit of the first communication network and/or within the remote server 4.

According to one embodiment, the module is constituted of one or more microprocessors, processors, or any other equivalent means programmed in an opportune manner.

At least one module is in particular capable of determining a communication link device from among the connected home automation equipment units of the first communication network, as a function of at least one characteristic feature of the connected home automation equipment units. At least one module is capable of maintaining a communication channel between the first communication network and the server 4 via the network equipment unit 12.

Figure 2:
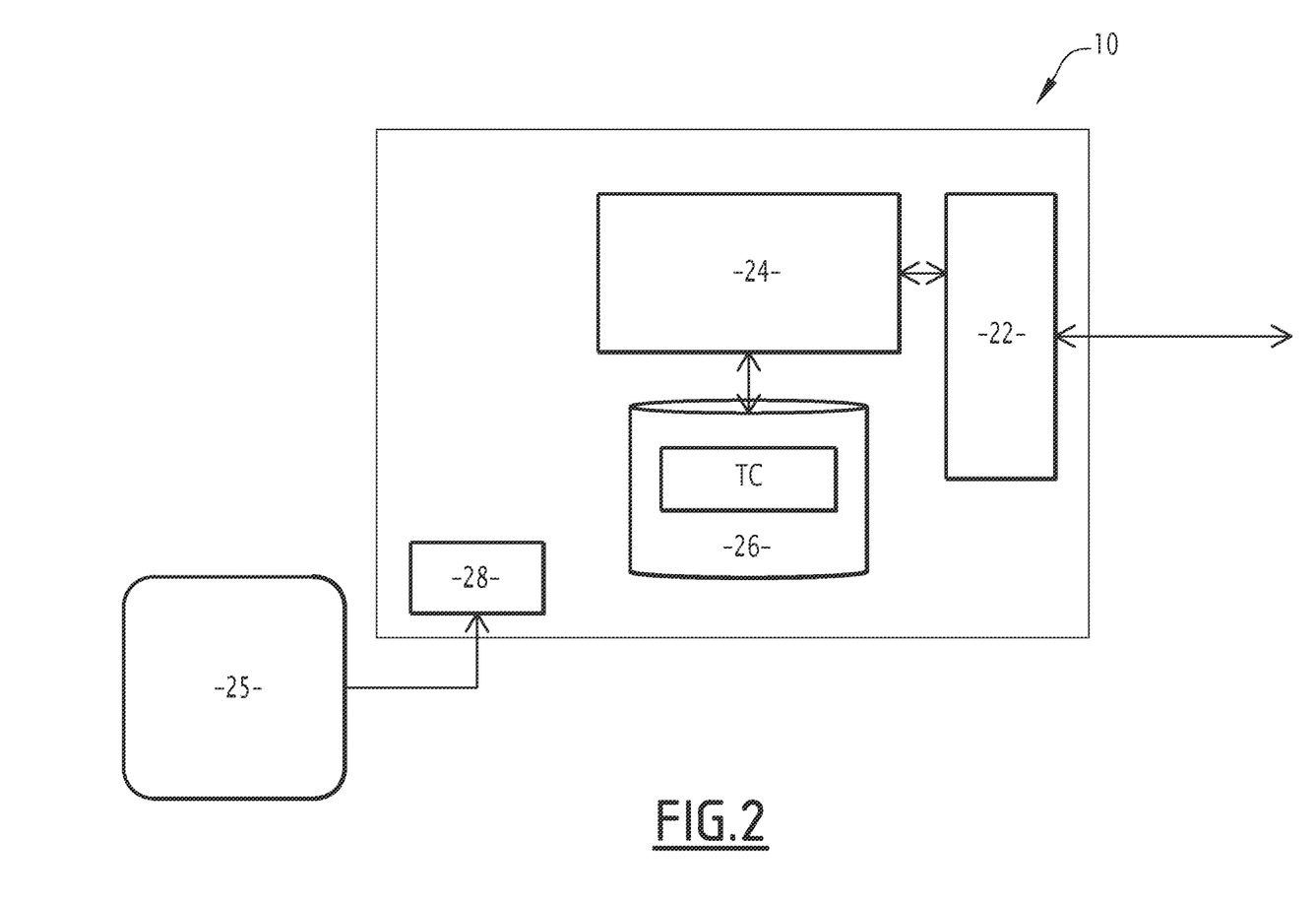
FIG. 2 is a schematic representation of a connected home automation equipment unit belonging to the first communication network.

FIG. 2 schematically illustrates a generic home automation equipment unit 10, intended to be connected to the first communication network 2.

The first communication network 2 is a wired or wireless communication network.

The home automation equipment unit 10 comprises at least one network interface 22 configured so as to be connected to at least one network interface of another home automation equipment unit 10 and/or that of the network equipment unit 12. The network interface 22 is capable of transmitting and/or receiving an electrical or electromagnetic signal, serving to effect respectively a connection to the wired or wireless communication network.

The connected home automation equipment unit 10 also includes a programmable computing device 24, comprising one or more processors or microprocessor, and at least one electronic memory storage unit 26, capable of recording data. According to one embodiment, a memory storage unit 26 is integrated into the programmable computing device 24. The programmable computing device 24 is, for example, a programmable logic component or a dedicated integrated circuit.

The programmable computing device 24 is capable of carrying out program code instructions making it possible to execute the steps of the communication sharing method according to the invention. These program code instructions are, for example, to be recorded in the memory storage unit 26 of the home automation equipment unit 10.

The home automation equipment unit 10 also includes an electrical power supply module 28, capable of supplying electrical energy to the home automation equipment unit 10.

In the example illustrated, the electrical power supply module 28 is connected to an electrical energy source 25, such as an electrical energy distribution network or one or more photovoltaic panels. By way of a variant, the electrical power supply module 28 is an autonomous electrical energy source, such as a physical-chemical storage means. It may be, for example, an accumulator battery, a rechargeable battery, a supercapacitor, or any other type of equivalent element. The electrical power supply module 28 is intended to be charged with electric energy by an external electric energy source 25.

In one mode of implementation, the method of the invention is implemented by modules of executable code instructions, recorded on a computer readable medium, for example an optical disc, a magneto-optical disc, a Read-Only Memory ROM, a Random Access Memory RAM, a non-volatile memory (Erasable Programmable Read-Only Memory EPROM, Electrically Erasable Programmable Read-Only Memory EEPROM, FLASH, Non-Volatile Random Access Memory NVRAM), a magnetic or optical card.

By way of a variant, the modules of executable code instructions according to the invention are executed by at least one programmable logic component such as an FPGA (for Field Programmable Gate Array), or even in the form of a dedicated integrated circuit such as an ASIC (for Application Specific Integrated Circuit).

The communication sharing method for sharing communication between the connected home automation equipment units of the first communication network 2 and a remote equipment unit belonging to the second communication network will be described with reference to FIGS. 3 to 6.

The first communication network 2 may be a communication network with mesh, hierarchical, star or any other type of topology.

Advantageously, the determination of the communication link device according to one of the two modes of implementation described, is carried out dynamically, for example, as soon as the communication link device $10_i$ undergoes a change: for example a breakdown, a disconnection, a loss of connection with the first communication network; or as soon as a new home automation equipment unit is connected to the first network, or even at regular time intervals.

According to one embodiment, each connected home automation equipment unit 10 is configured so as to establish a communication link with the remote server 4 when it is connected to the first communication network 2.

Figure 3:
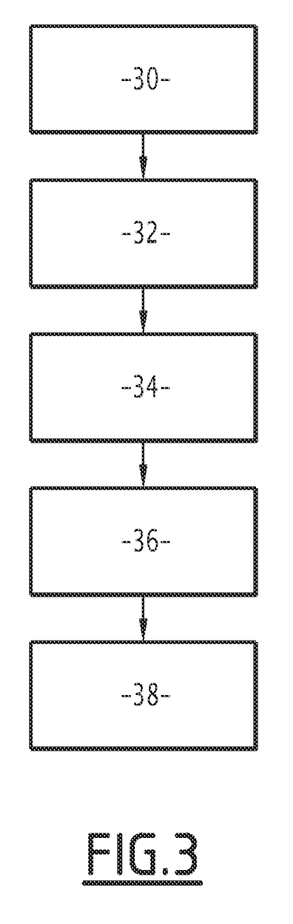
FIG. 3 is a block diagram of the main steps of a communication sharing method according to a first mode of implementation of the invention.

FIG. 3 is a block diagram of the main steps of a first mode of implementation of the invention. The steps 30 to 34 described below are carried out by the connected home automation equipment unit 10 of the first communication network 2. In this first mode of implementation, each connected home automation equipment unit belonging to the first communication network is capable of implementing the communication sharing method.

The method includes a first step 30 of discovery for discovering the connected home automation equipment units belonging to the first communication network 2.

During the discovery step 30, at least one connected home automation equipment unit transmits a discovery request sent to each connected home automation equipment unit belonging to the first communication network 2. The request may be transmitted in a multicast (or "broadcast" per accepted terminology) communication mode.

In return, at least connected home automation equipment unit of the first communication network transmits a message containing a set of local characteristic information items to be sent to the home automation equipment unit that is transmitting the discovery request.

Each set of characteristic information items is received by the home automation equipment unit transmitting the discovery request and then saved and stored during a save and store step 32 in its memory storage unit 26. According to one mode of implementation, each set of characteristic information items is saved and stored in the form of a table of characteristic features TC of the home automation equipment units of the first network.

During the discovery step, the equipment unit transmitting the discovery request also transmits its specific local characteristic information items to the other connected home automation equipment units. The characteristic information items of the transmitting home automation equipment unit may also be recorded during the save and store step 32, for example, in the form of a table of characteristic features TC.

The set of information items includes, for a connected home automation equipment unit $10_j$ (j representing an index between 1 and N):
  an identifier of the home automation equipment unit 10, in the first communication network,
  a local network address, and
  the values of characteristic features in a predetermined set of characteristic features, comprising in particular:
    a characteristic feature related to type of electrical power supply, from among for example, power supply by an electrical energy distribution network, by photovoltaic panels, by an autonomous power supply (eg battery);
    a characteristic feature related to on-board computing capacity, for example based on type of processor of the equipment unit;
    a characteristic feature related to quality of service, for example implementation of a routing function for the first network;
    a characteristic feature related to spatial position in the first communication network, for example a central or peripheral position;
    at least one a characteristic feature related to radiofrequency performance such as a measurement of the reception strength (or RSSI for "Received Signal Strength Indication"), a signal quality, a transmission strength level;
    at least one characteristic feature related to environment such as a radiofrequency pollution level, an electromagnetic disturbance level.

The set of characteristic features listed above is not exhaustive.

Some of the features may be computed by the connected home automation equipment unit, for example, by using its programmable computing device, for example at the time of first connecting to the communication network and/or at the time of receiving a discovery message.

Part of the set of characteristic features may be pre-populated at the factory or during the installation and connection, in the first communication network, of the home automation equipment unit $10_j$, for example by the installation operator. They may be saved and stored in a memory storage unit 26 of the home automation equipment unit $10_j$. These may be, for example, invariant characteristic features such as the type of power supply or the computing capacity of the home automation equipment unit. In an advantageous manner, this saving-storing makes it possible to avoid the need for computation upon each instance of reception or transmission of a discovery request.

The discovery request is transmitted at least once at the time of powering up and connection to the first communication network of a home automation equipment unit $10_j$.

The connected home automation equipment unit 10 then implements a communication link determining step 34 for determining a communication link device $10_i$ from among all the connected home automation equipment units $10_j$ of the first network, listed in the table of characteristic features TC.

The communication link device $10_i$ is selected as a function of at least one characteristic feature of the connected home automation equipment units $10_j$.

Preferably, the home automation equipment unit selected to be the communication link device is supplied with electricity by an electrical energy distribution network, occupies a central position in the first communication network and incorporates a routing function. In an advantageous manner, such a connected home automation equipment unit is not limited in electrical energy supply by the autonomy of its physical-chemical storage means. In addition, its central position in the first communication network makes it possible to limit the transit times of the messages exchanged between the communication link device and the one or more other connected home automation equipment unit/s.

For example, in one mode of implementation, for each home automation equipment unit $10_j$ listed in the table of characteristic features TC, the programmable computing device 24 reads each characteristic feature from the memory storage unit 26 and associates a score therewith.

For example, for the first characteristic feature related to type of electric power supply, the programmable computing device 24 associates a first score S1: a maximum score, for an equipment unit powered by a connection to the electrical energy distribution network, a mean score when powered by photovoltaic panels, and a low score for an autonomous (self-contained) equipment unit.

The scores are predetermined digital values, for example, saved and stored in a memory storage unit 26 of the connected home automation equipment unit.

For the second characteristic feature related to on-board computing capacity, the programmable computing device 24 associates a second score S2 linked to the type of on-board processor.

For the third characteristic feature related to quality of service, the programmable computing device 24 associates a third score S3, which is maximal for the home automation equipment units that implement a routing function for the first network.

For the fourth characteristic feature related to spatial position in the first network, the programmable computing device 24 computes a spatial barycenter for the first network, and associates a fourth score S4, which is inversely propositional to the distance between the home automation equipment unit and the spatial barycenter. For example, the programmable computing device 24 assigns a maximum score to a home automation equipment unit located at less than a predetermined distance from the spatial barycenter.

Similar calculations are performed in order to determine the score S5, S6 associated respectively with the characteristic feature related to radiofrequency performance and environment.

Thereafter, the programmable computing device 24 calculates an overall score associated with each home automation equipment unit $10_j$, for example equal to the mean or to a mean weighted by variable weighting coefficients of the previously assigned scores S1 to S6. The use of different weighting coefficients makes it possible to associate a priority level with certain characteristic features, for example to prioritise the characteristic feature related to type of power supply.

According to one mode of implementation, each connected home automation equipment unit records its overall score in its electronic memory storage unit 26.

Finally, it is the home automation equipment unit $10_i$ that has obtained a maximum overall score which is selected as the communication link device.

In an advantageous manner, taking into account the environment related characteristic features in order to determine the communication link device 10, provides the ability to limit the probability of obtaining the same overall score for two connected home automation equipment units. Indeed, it is possible for two connected home automation equipment units to be similar and close within the first communication network but not in the same environment and they are therefore subject, for example, to different electromagnetic disturbances.

If multiple connected home automation equipment units obtain the same overall score, which is the maximum score, each of these connected equipment units assumes the role of communication link device until such time as the overall scores are newly determined.

If subsequently, a new instance of determination of a communication link device is performed, for example following the connection of a new connected home automation equipment unit or after a predetermined time period has elapsed, the environment related characteristic features of the connected home automation equipment units will have changed and one of the connected home automation equipment units will have an overall score higher than the others and will become the new communication link device.

The connected home automation equipment units that have not been selected, in the step 36, deactivate as appropriate, the communication channel established previously with the remote server 4 via the network equipment unit 12. For example, when the UDP ("User Datagram Protocol") is implemented, the deactivation of the communication channel consists in discontinuing sending of elementary packets for maintaining connection with the remote server and awaiting the lapse of the predetermined time period ("timeout").

The selected communication link device implements and maintains active (step 38) a communication channel with the remote server 4.

During the step 38, the communication link device $10_i$ maintains active the communication channel, for example, by regularly sending small elementary packets for maintaining connection, also known as "keep alive packets" (per accepted terminology), in the absence of network traffic, so as to maintain active the communication "hole" via the network equipment unit 12 according to the UDP.

During the step 38, the communication link device $10_i$ redistributes the messages received from the remote server to the one or more receiving home automation equipment unit/s of the first network, and/or transmits messages in multicast (or "broadcast" per accepted terminology) mode through the first communication network.

Two modes of implementation of step 38 will be described below with reference to FIGS. 5 and 6.

The communication sharing method may be implemented by one or more particular connected home automation equipment unit/s or by each connected home automation equipment unit of the first communication network 2.

According to one mode of implementation of the communication sharing method, when one or more new home automation equipment unit/s connect to the first communication network, each of the new home automation equipment units establishes a communication link with the remote server in order to be able to dialogue with the latter.

A discovery step 30 is thereafter implemented by each of the new home automation equipment units. In response to each of the discovery requests, the communication link device and each of the new home automation equipment units other than the sender of the request, transmit their respective local characteristic information items.

The local characteristic information items are then recorded during a save and store step 32 followed by a communication link determining step 34 for determining a communication link device which are implemented by each new home automation equipment unit as well as by the communication link device selected previously.

Following the calculation of the overall scores, each connected home automation equipment unit, among the previously selected communication link device and the new home automation equipment units, compares its overall score with the other calculated overall scores in order to determine whether it can delegate its communication link with the remote server to another connected home automation equipment unit having a higher overall score. If such a device is found, the connected home automation equipment unit deactivates its communication channel with the remote server during a step 36. If no other connected home automation equipment unit has an overall score that is higher than that of the connected home automation equipment unit considered, the connected home automation equipment unit considered maintains its communication channel with the remote server (step 38), and becomes the communication link device.

In a particular case, if multiple connected home automation equipment units have the same maximum overall score, each of these connected home automation equipment units becomes the communication link device.

According to one variant, following the transmission of at least one discovery request, each of the connected home automation equipment units belonging to the first communication network responds to the at least one request and then implements steps 32 to 38 described above. Following the reception of a discovery request, each home automation equipment unit may establish a communication channel with the remote server. According to one variant of implementation, the device selected as the communication link device establishes a communication channel with the remote server during the step 38, if it is not already directly connected to the remote server, and then maintains it active for the benefit of the other home automation equipment units connected to the first communication network.

According to another mode of implementation, when the first communication network loses the communication link device, for example, following a failure of the latter, disconnection thereof, a loss of connection with the first communication network, each home automation equipment unit connected to the first communication network establishes a communication channel with the remote server and implements the communication sharing method.

According to one variant of implementation, each home automation equipment unit connected to the first communication network implements the communication sharing method, then the home automation equipment unit selected as the communication link device establishes a communication channel with the remote server which it maintains active for the benefit of the other connected home automation equipment units of the first communication network.

Figure 4:
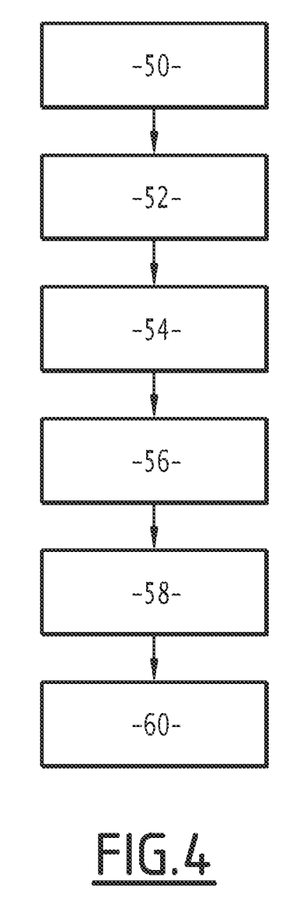
FIG. 4 is a block diagram of the main steps of a communication sharing method according to a second mode of implementation of the invention.

FIG. 4 is a block diagram of the main steps of the communication sharing method in a second mode of implementation of the invention. The steps 50 to 58 of the method are implemented by the remote server 4.

It is assumed that all or part of the connected home automation equipment units $10_1, \ldots, 10_N$, of the first communication network 2 each maintain active a communication channel with the remote server 4.

A communication channel may have been established with the remote server by all the connected home automation equipment units $10_1, \ldots, 10_N$, of the first communication network following the connection of one or more new home automation equipment unit/s to the communication network, or following the loss of the previously selected communication link device. According to one variant, a communication channel may have been established with only the communication link device and the one or more new connected home automation equipment unit/s.

During a discovery step 50, the remote server 4 transmits a discovery request sent to all the connected home automation equipment units belonging to the first communication network 2. In response, each connected home automation equipment unit $10j$ transmits to the server a discovery message comprising a set of global characteristic information items. The remote server 4 receives, during a reception step 52, the set of global characteristic information items for each connected home automation equipment unit $10_j$ of the first network. This set of information items comprises, for the connected home automation equipment unit $10_j$:
an identifier of the home automation equipment unit in the first network,
a global network address, and
the values of characteristic features in a predetermined set of characteristic features.

The set of characteristic features is the same as that described previously with reference to FIG. 3.

The server 4 saves and stores in a memory storage unit, during the step 52, the set of global characteristic information items received from each connected home automation equipment unit, for example in the form of a table of characteristic features analogous to the table TC described above.

The server 4 implements, for example by using its programmable computing device, a step 54 of determining a communication link device $10_i$ from among all the connected home automation equipment units $10_j$ of the first network, listed in the table of characteristic features. The step 54 is analogous to the step 34 described above.

At the end of step 54, a communication link device 10, is selected as a function of at least one value of the associated characteristic features and/or of the assigned scores.

Thereafter the remote server transmits, during the command sending step 56, a disconnection command sent to all the connected home automation equipment units $10_j$ other than the communication link device $10_i$, that are maintaining active a communication channel with the remote server. Following the reception of the command, each receiving home automation equipment unit disconnects from the server, for example by transmitting to the latter a specific signal or by ceasing to transmit the keep alive packets.

The server also sends during a command sending step 58, a command for maintaining the communication channel active, directed to the communication link device $10_i$, so as to inform this equipment unit of its role of maintaining the shared communication link for the benefit of the other connected home automation equipment units.

Subsequently, during the step 60, the communication link device executes the task of maintaining active the communication channel, in a manner analogous to the previously described step 38.

According to one mode of implementation, during the task of maintaining active the communication channel with the remote server 4 (step 38 or 60), the communication link device disseminates, at regular time intervals, an informational message sent to the other connected home automation equipment units 10, 10₁, 10₂, 10₃, 10_N indicating that it is in service and that it is connected to the remote server. The information message may be transmitted over the first communication network 6 in a multicast (ie broadcast) communication mode. Thus, the other connected home automation equipment units belonging to the first communication network 2 can, if they do not receive the information message, be informed of the loss of the shared link with the remote server 4.

According to one mode of implementation, the communication link device $10_i$ transmits, to the other connected home automation equipment units, a message so as to inform them that the direct communication channel with the remote server has been interrupted and that it is no longer able to establish the connection with the remote server. For example, the message is transmitted over the first communication network 2 in a multicast communication mode. Thus, the other connected home automation equipment units can then also try to reach the remote server in order to establish a communication channel with the latter and, if successful, implement the communication sharing method for sharing communication between the connected home automation equipment units in order to determine a new communication link device.

Figure 5:
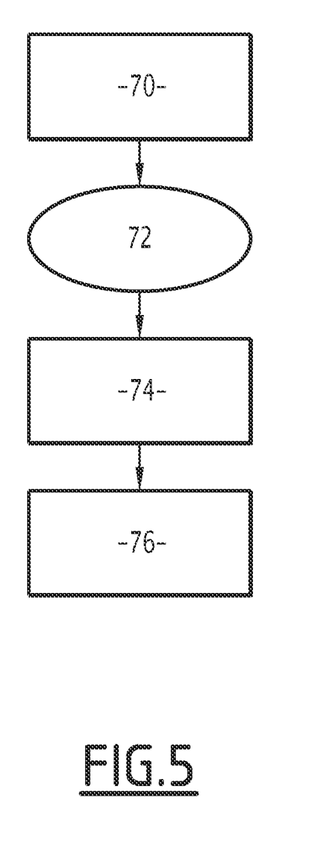
FIG. 5 is a block diagram of the main steps of the implementation of the communication link according to a first mode of implementation.
Figure 6:
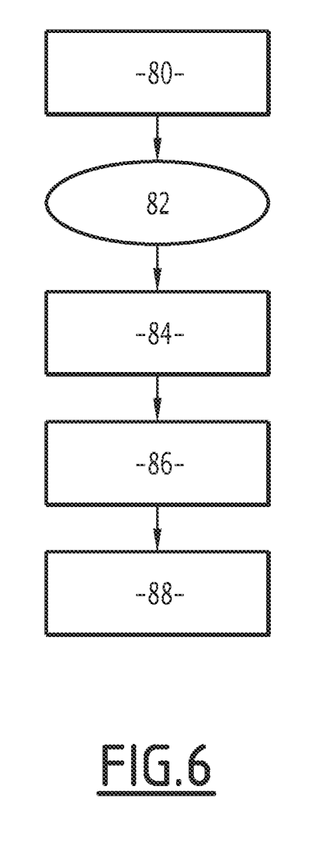
FIG. 6 is a block diagram of the main steps of the implementation of the communication link according to a second mode of implementation.

FIGS. 5 and 6 illustrate two variants of the communication link step 38 or 60 implemented by the selected communication link device. During this step 38, 60, in the absence of network traffic, the communication link device $10_i$ transmits keep alive packets sent to the remote server. The keep alive packets are spaced apart by a time interval whose duration is less than the predetermined time period ("timeout").

According to a first variant, described with reference to FIG. 5, the remote server 4 sends (step 70) to the communication link device $10_i$ a request 72 containing, for example, a command, a control message, an updating message, or an information item, to be sent to one receiving connected home automation equipment unit $10_k$ (k representing an index between 1 and N) or to a plurality of receiving connected home automation equipment units. The request includes, for example, the one or more identifier/s of the receiving connected home automation equipment unit/s.

The communication link device $10_i$ receives the request 72 during the reception step 74, and transmits, during the redistribution step 76, the request or the command to be executed, to the one or more receiving connected equipment unit/s.

According to a second variant, described with reference to FIG. 6, the server 4 sends (step 80) to the communication link device $10_i$ an event message 82 intended to inform the communication link device $10_i$ that the server 4 has a message, for example a command, a control message, an update message, a request for information, for one or more receiving home automation equipment unit/s, these receiving home automation equipment units being identified in the event message 82.

The communication link device $10_i$ receives the event message 82 in the reception step 84, and transmits a corresponding information message to the one or more receiving home automation equipment unit/s in the transmission step 86.

By way of a variant, the communication link device $10_i$ transmits the information message using a multicast type communication mode during the transmission step 86.

Upon reception of this information message, the one or more receiving home automation equipment unit/s, during the course of step 88 each establish a direct communication channel with the remote server 4 in order to establish a secure communication session with the latter.

This second variant has the advantage of improving the security of communications. Indeed, advantageously, the event message 82 sent by the server 4 to the communication link device is "lightweight" as compared to the request 72 described previously, since it does not include detailed data relating to the command to be executed for example, or to the requested information items.

In addition, potentially sensitive information items and/or commands to be executed (for example, deactivation of an alarm, unlocking of an access, etc) are exchanged through a secure link between the server and the receiving equipment unit. The event message transmitted by the server 4 does not contain sensitive data, and therefore is more difficult to hack at the local network level. Any sensitive data is then exchanged over a communication channel which can be secured between the concerned home automation equipment unit of the first local communication network and the remote server.

This second implementation variant also makes it possible to facilitate the securing of the data links between the remote server and the home automation equipment units belonging to the first communication network 2. In fact, it is easier to achieve a secure communication link between a connected home automation equipment unit of the local network and the remote server rather than securing a communication link between two or more connected home automation equipment units belonging to the first communication network 2.

Another advantage of the second variant of implementation is the ability to establish more direct communication without involving a third-party connected home automation equipment unit.

The invention claimed is:

1. A communication sharing method for sharing communication between a plurality of connected home automation equipment devices belonging to a first communication network and a remote equipment device connected to a second communication network, the first communication network being connected to the second communication network by a network equipment device configured to enable communication between at least one of the connected home automation equipment devices of the first communication network and said remote equipment device, the method comprising:
  determining one communication link device configured to establish a communication link from among the connected home automation equipment devices of the first communication network, as a function of at least one characteristic feature of said connected home automation equipment devices; and
  maintaining, by said one communication link device, an active communication channel, between the first communication network and the remote equipment device connected to the second communication network, through said network equipment device, for the benefit of all of the other connected home automation equipment devices of the first communication network,
  wherein the determined communication link device operationally implements a communication link function comprising
    receiving an event message containing an information item related to a presence of a command, an update, or an information item, to be sent to at least one receiving connected home automation equipment device, and
    transmitting an information message to said at least one receiving connected home automation equipment device, said at least one receiving connected home automation equipment device implementing, following receiving said information message, a direct communication channel with said remote equipment device.

2. The communication sharing method according to claim 1, wherein the maintaining the active communication channel comprises a regular sending of elementary connection maintenance packets by said communication link device to the remote equipment device.

3. The communication sharing method according to claim 1, wherein the determining the one communication link device depends on the at least one characteristic feature from among a set of characteristic features comprising a characteristic feature related to a type of electrical power supply, a characteristic feature related to on-board computing capacity, a characteristic feature related to a quality of service, a characteristic feature related to a spatial position in the first network, and a characteristic feature related to the radio frequency environment.

4. The communication sharing method according to claim 3, wherein each of the connected home automation equipment devices belonging to the first communication network carries out the determining the one communication link device from among the connected home automation equipment units and effectively implements:
   receiving a discovery message originating from at least one other connected home automation equipment device belonging to said first communication network, the at least one other connected home automation equipment device comprising an identifier of said other connected home automation equipment device and a characteristic feature value associated with each of the characteristic features of said set of characteristic features for said other connected home automation equipment device, and
   saving and storing the received characteristic feature values in a table of characteristic features, the one communication link device being determined as a function of the characteristic feature values saved and stored in the table of characteristic features.

5. The communication sharing method according to claim 4, wherein the determining the one communication link comprises
   calculating a first overall score associated with said at least one other connected home automation equipment device as a function of the saved and stored characteristic feature values,
   calculating a specific overall score, and
   comparing the calculated first and specific overall scores, wherein the determined one communication link device having a maximum associated overall score.

6. The communication sharing method according to claim 3, further comprising, implemented by the remote equipment device,
   receiving from at least some of the plurality of the connected home automation equipment devices belonging to the first communication network, a set of global characteristic information items of each of the connected home automation equipment devices of said plurality of the connected home automation equipment devices, the set of global characteristic information items comprising an identifier of said connected home automation equipment device and a characteristic feature value associated with each of the characteristic features of said set of characteristic features for said connected home automation equipment device;
   saving and storing the values of characteristic features received in a table of characteristic features; and
   calculating an overall score associated with each of the connected home automation equipment devices among said plurality of connected home automation equipment devices, as a function of the saved and stored characteristic feature values,
   wherein the one communication link device is determined as a function of the calculated overall scores.

7. The communication sharing method according to claim 6, wherein the determining the one communication link device comprises
   the calculating the overall score associated with each of the connected home automation equipment devices among said plurality of connected home automation equipment devices, as a function of the saved and stored characteristic feature values, and
   comparing the calculated overall scores,
   wherein the determined one communication link device has a maximum associated overall score.

8. The communication sharing method according to claim 6, further comprising sending a maintenance command to maintain the communication channel to said determined one communication link device.

9. The communication sharing method according to claim 6, further comprising sending a disconnection command to all the connected home automation equipment devices other than the determined one communication link device.

10. The communication sharing method according to claim 1, wherein the determined one communication link device operationally implements a communication link function comprising:
    receiving a request containing the command, the update, or the information item, to be sent to the at least one receiving connected home automation equipment device, and
    transmitting said request to said at least one receiving connected home automation equipment device.

11. A communication sharing system for sharing communication between a plurality of connected home automation equipment devices belonging to a first communication network and a remote equipment device connected to a second communication network, the first communication network being connected to the second communication network by a network equipment device configured to enable communication between at least one of the connected home automation equipment devices of the first communication network and said remote equipment device, the system comprising:
    one or more processors configured to:
       determine one communication link device configured to establish a communication link from among the connected home automation equipment devices of the first communication network, as a function of at least one characteristic feature of said connected home automation equipment devices; and
       maintain, by said one communication link device, of a an active communication channel, between the first communication network and the remote equipment unit device connected to the second communication network through said network equipment device, for the benefit of all of the other connected home automation equipment devices of the first communication network,
    wherein the determined communication link device operationally implements a communication link function comprising receiving an event message containing an information item related to a presence of a command, an update, or an information item, to be sent to at least one receiving connected home automation equipment device, and transmitting an information message to said at least one receiving connected home automation equipment device, said at least one receiving connected home automation equipment device implementing, following receiving said information message, a direct communication channel with said remote equipment device.

12. The communication system according to claim 11, wherein each of the connected home automation equipment devices belonging to the first communication network comprises a communication link determining module configured to determine a communication link device.

13. The communication system according to claim 11, wherein the remote equipment device comprises a communication link determining module configured to determine a communication link device.

14. The communication sharing method according to claim 2, wherein the determining the one communication link device depends on the at least one characteristic feature from among a set of characteristic features comprising a characteristic feature related to a type of electrical power supply, a characteristic feature related to on-board computing capacity, a characteristic feature related to a quality of service, a characteristic feature related to a spatial position in the first network, and a characteristic feature related to the radio frequency environment.

15. The communication sharing method according to claim 7, further comprising sending a maintenance command to maintain the communication channel to said determined one communication link device.

16. The communication sharing method according to claim 7, further comprising sending a disconnection command to all the connected home automation equipment devices other than the determined one communication link device.

17. The communication sharing method according to claim 8, further comprising sending a disconnection command to all the connected home automation equipment devices other than the determined one communication link device.

18. The communication sharing method according to claim 2, wherein the determined one communication link device operationally implements a communication link function comprising:

receiving a request containing the command, the update, or the information item, to be sent to the at least one receiving connected home automation equipment device, and transmitting said request to said at least one receiving connected home automation equipment device.

19. The communication sharing method according to claim 3, wherein the determined one communication link device operationally implements a communication link function comprising:

receiving a request containing the command, the update, or the information item, to be sent to the at least one receiving connected home automation equipment device, and transmitting said request to said at least one receiving connected home automation equipment.

20. A communication sharing method for sharing communication between a plurality of connected home automation equipment devices belonging to a first communication network and a remote equipment device connected to a second communication network, the first communication network being connected to the second communication network by a network equipment device configured to enable communication between at least one of the connected home automation equipment devices of the first communication network and said remote equipment device, the method comprising:

determining one communication link device configured to establish a communication link from among the connected home automation equipment devices of the first communication network, as a function of at least one characteristic feature of said connected home automation equipment devices; and maintaining, by said communication link device, an active communication channel, between the first communication network and the remote equipment device connected to the second communication network, through said network equipment device, for the benefit of all of the other connected home automation equipment devices of the first communication network, wherein the determining and the maintaining are repeated at one of: (i) regular time intervals, (ii) as soon as the communication link device undergoes a change, and (iii) as soon as a new home automation equipment device is connected to the first network.

* * * * *